Oct. 20, 1959  C. P. KOLTHOFF, JR., ET AL  2,909,363
MATRIX AND EDGE SEALING MEANS FOR ROTARY REGENERATOR
Filed Feb. 3, 1958  2 Sheets-Sheet 2
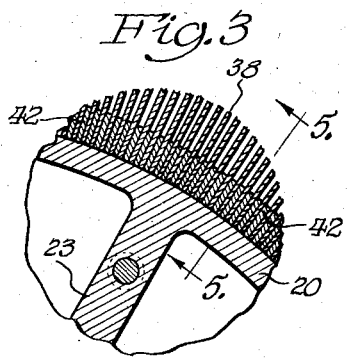
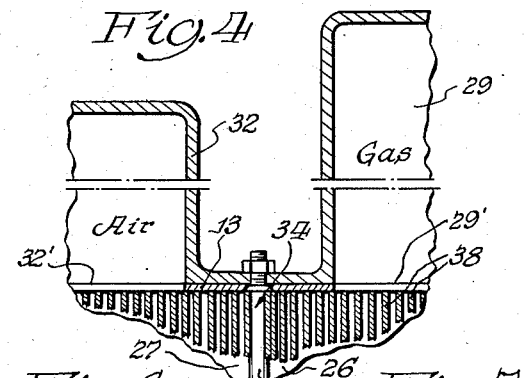
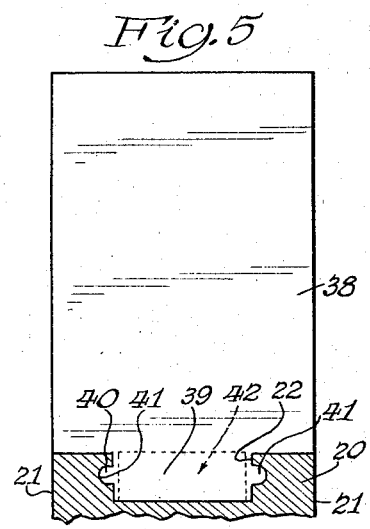
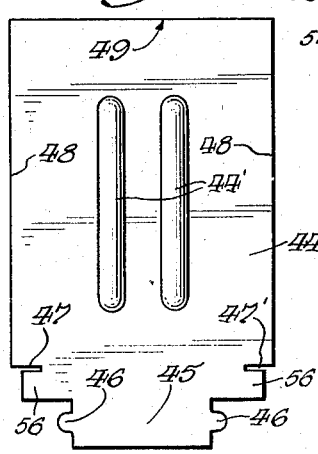
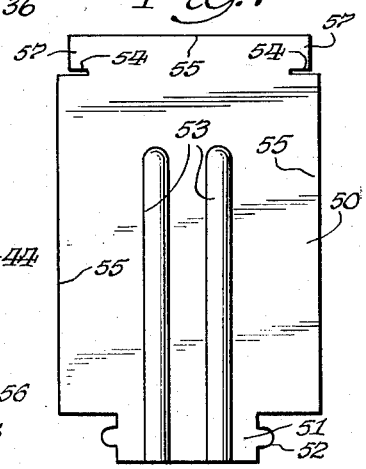
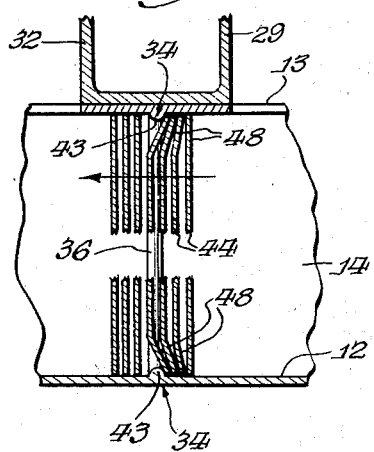
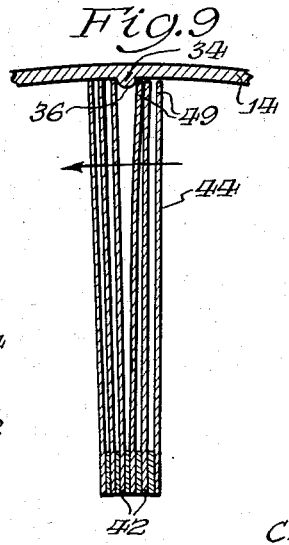
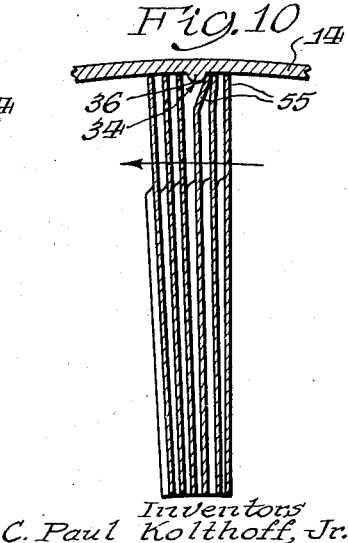
Inventors
C. Paul Kolthoff, Jr.
Mack M. Jones
Attorney

United States Patent Office 2,909,363
Patented Oct. 20, 1959

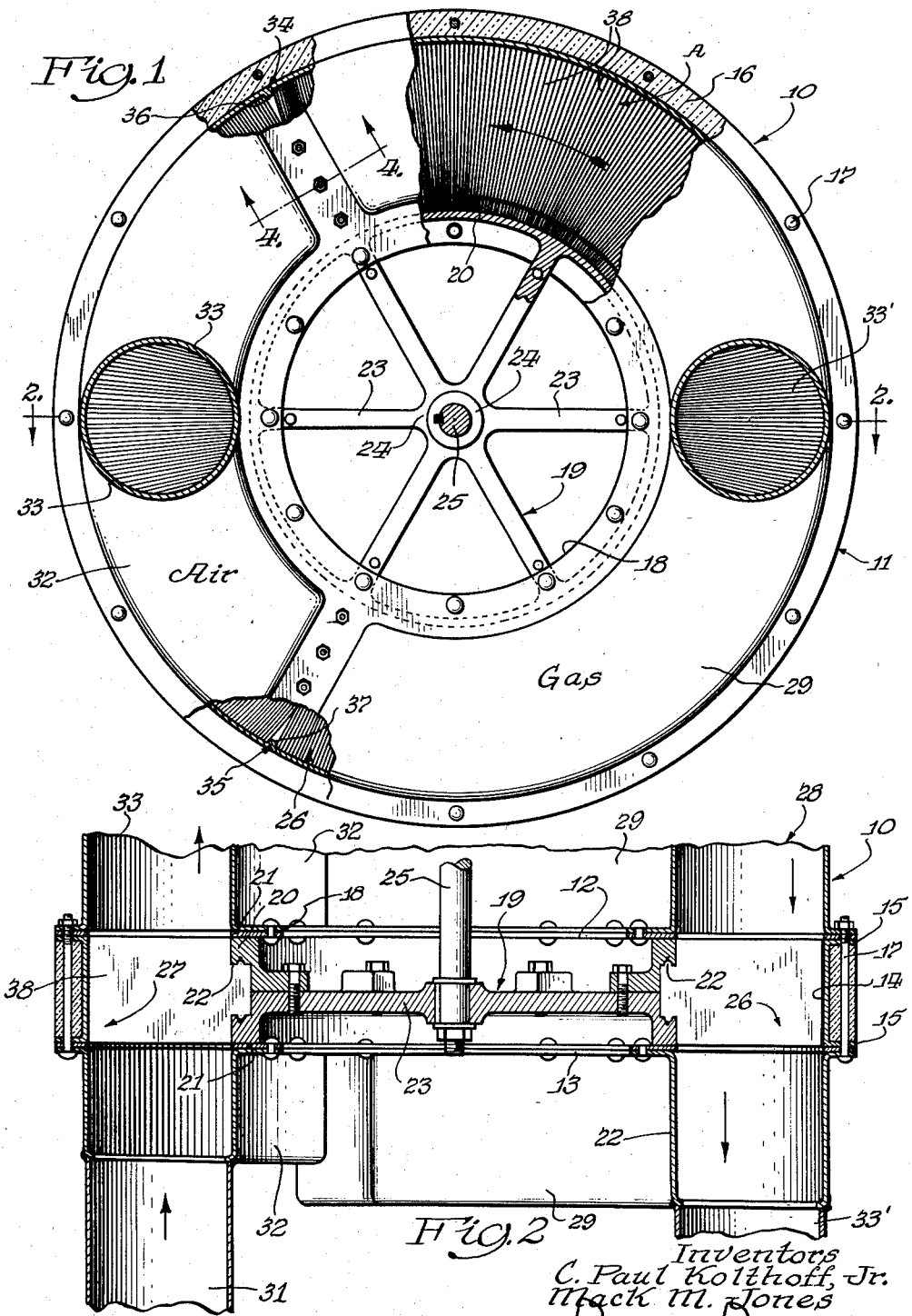

2,909,363

MATRIX AND EDGE SEALING MEANS FOR ROTARY REGENERATOR

C. Paul Kolthoff, Jr., Naperville, and Mack M. Jones, Western Springs, Ill., assignors to International Harvester Company, Chicago, Ill., a corporation of New Jersey Application February 3, 1958, Serial No. 712,902

2 Claims. (Cl. 257—269)

This invention relates to a heat exchanger of the rotary regenerator type. More specifically, the invention relates to an improved matrix and edge sealing arrangement for a rotary regenerator.

In order to increase the operating efficiency of a gas turbine, regenerators are extensively used. A type of regenerator which is particularly adapted for gas turbine operation is the rotary type. The purpose of the regenerator, when used with a gas turbine, is to utilize the hot exhaust gases, which are discharged from the gas turbine, for preheating the air which leaves the compressor in its travel to the combustors of the gas turbine. Thus by pre-heating the air as it leaves the compressor, with the exhaust gases of the turbine, efficiency is greatly increased since heat energy which normally would be wasted can be utilized for the benefit of the operation.

The rotary regenerator comprises, in most instances, a cylindrical casing in which a rotor is positioned. The cylindrical casing is divided into a first chamber through which the exhaust gases pass and a second chamber which is in communication with the compressor and through which the compressed air is forced. The rotor generally includes a matrix having various types of configurations particularly adapted to provide effective heat exchange surfaces. The matrix surfaces, during rotation of the rotor, while in the exhaust gas chamber are heated by the hot gases, and these heat exchange surfaces in turn pass into the compressed air chamber whereupon the compressed air is heated as it is discharged to the combustor of the gas turbine engine. In view of the rotating matrix, great difficulties have been experienced in the sealing off of the two chambers so that the exhaust gases and compressed air are prevented from intermingling and traveling between the chambers. Furthermore, it is desirable to prevent the carry-over of cooler compressed air into the exhaust chamber. It is a prime object of this invention, therefore, to provide an improved matrix for rotary regenerators.

It is another object to provide an improved matrix having an improved sealing means adapted to effectively seal the chambers of a rotary regenerator.

It is a still further object to provide an improved seal for rotary regenerators, the seal cooperating with the matrix to provide effective sealing means between the chambers of the regenerator.

It is another object of the invention to provide an improved matrix for a rotary regenerator, the said matrix including a plurality of relatively thin leaves which are mounted for rotation on a rotor, the said leaves cooperating with projecting elements on the interior walls of a casing to effectively provide a continuous seal at spaced dividers separating the chambers of the regenerator.

These and further objects will become more readily apparent from a reading of the description when examined in connection with the accompanying sheets of drawings.

In the drawings:

Figure 1 is a side elevational view of an improved rotary regenerator having certain portions of the casing broken away to illustrate the invention;

Figure 2 is a cross sectional view taken particularly along the line 2—2 of Figure 1;

Figure 3 is an enlarged detail view of a portion of a rotary regenerator including portions of a matrix carried thereon;

Figure 4 is an enlarged cross sectional view taken substantially along the line 4—4 of Figure 1;

Figure 5 is a detail view of a matrix element showing its connection to a portion of a rotor taken substantially along line 5—5 of Figure 3;

Figure 6 is a detail elevational view showing a modified form of a matrix element;

Figure 7 is a detail view showing another modified form of a matrix element;

Figure 8 is a sectional view, similar to Figure 4, but showing a modified form of a divider for a rotary regenerator using vane elements of a type shown in Figs. 6 and 7.

Figure 9 is a detail operational view, in section, showing an operative position of the matrix element shown in Figure 6; and Figure 10 is an operational view of a plurality of matrix elements of the type shown in Figure 7.

Referring now particularly to Figures 1 and 2, a rotary regenerator is designated generally by the reference character 10. The rotary regenerator 10 comprises essentially a cylindrical casing 11 consisting of side plates 12 and 13 laterally spaced. The side plates 12 and 13 are connected by an outer wall 14 having outwardly extending flanges 15. An insulating ring 16 is disposed between the flanges 15. The assembly being suitably retained thereon by a plurality of bolts 17. The plates 12 and 13 are suitable apertured to provide centrally disposed openings 18.

A rotor 19 is positioned for rotation within the casing 11. The rotor 19 comprises an outer ring 20 having sides 21 in rotating but snug relation with respect to the circular side walls 12 and 13. The rotor ring 20 also includes a circumferentially extending recess 22 and the ring 20 is provided with spokes 23 which are integral with a hub 24. The hub 24 is suitably keyed to a shaft 25 for rotation therewith.

The cylindrical casing 11 is divided into a gas chamber 26 and an air chamber 27. Referring now particularly to Figure 2, an exhaust gas inlet conduit is designated at 28. The inlet conduit 28 is adapted to deliver exhaust gases to the chamber 26. Ducts 29 are suitably connected to the cylindrical sides 12 and 13, the said ducts 29 having open sides 29', one of which is indicated in Figure 4, the said open sides 29' being substantially coextensive with the chamber 26. An inlet conduit 31 is adapted to deliver air from a compressor (not shown) to the chamber 27. Ducts 32 are also suitably connected to the sides 12 and 13, the said ducts being open on one side, one of which is indicated in Figure 4, at 32', the said open portions 32' being substantially coextensive with the chamber 27. An air outlet chamber and conduit 33 communicates with the duct 32 and a gas outlet conduit 33' communicates with the duct 29.

The chambers 26 and 27 are divided from one another by means of dividers 34 and 35 circumferentially spaced within the casing 11. The dividers 34 and 35 comprise essentially transversely extending projections or ridges 36 and 37, respectively. The ridges 36 and 37 may be formed integral with the outer wall 14 and extend transversely substantially the width of the said outer wall 14.

The rotor 19 carries for rotation therewith a matrix generally designated at A. The matrix A comprises a plurality of relatively thin leaves 38, one of such leaves being shown in detail in Figure 5. The leaves 38 each include a tongue 39 having outwardly projecting nibs 40, the said tongue 39 being disposed within the recess 22 and the nibs 40 being suitably engaged within opposed grooves 41 in the ring 20. The nibs 40 may be suitably retained within the grooves 41 by means of brazing or other securing methods. A spacer member 42, as best shown in Figure 3, is positioned between each leaf 38, the said spacer members being suitably connected to the tongues 39 of each leaf 38.

In the operation of the rotary regenerator exhaust gases enter into the inlet duct 28, from the exhaust conduit (not shown) of a gas turbine. The exhaust gas thus enters into the chamber 26 and all of the leaves 38 which are at any given time disposed within the chamber 26 are heated to a high temperature by the exhaust gases discharged through the conduit 33'. The rotor 19 is rotating, as shown in Figure 1, in the direction of the arrow, and the leaves 38 which have been so heated now pass the divider 34 and enter into the chamber 27. As the heated leaves 38 move into the chamber 27 they have their upper edges momentarily in contact with the projection 36. As a heated leaf 38, as shown for instance in Figure 1, has its outermost edge engage the projection 36, it is momentarily delayed in its travel to the chamber 27, by the frictional engagement of the said edge with the projection 36. Certain of the leaves 38 disposed rearwardly with respect to the direction of travel are compacted together with the leaf 38 which is momentarily in engagement with the projection 34. This compacting action at the divider 36, provides an edge seal at the division between the chambers 26 and 27 and exhaust gases between the leaves 38, while they still are within the exhaust chamber 26, are forced or squeezed outwardly from between the leaves. Thus, carry-over of exhaust gases into the air chamber 27 is largely eliminated and the leaves as they pass into the chamber 26 with the projection 36 provide a seal to suitably seal the exhaust chamber from the air chamber.

The hot leaves which are now disposed in the air chamber transfer the heat to the compressed air which is forced through the inlet conduit 31 by means of a compressor (not shown). All of the leaves within the chamber 27 at any given time are engaged by the air which flows into the chamber 27 and into the duct 32. Thus the air, as it is forced through the chamber 27, is preheated before it enters into the combustor of the gas turbine engine.

The divider 35 operates in the same manner as the divider 34. As the leaves 38 are rotated with the rotor the particular leaf 38 which engages the projection 37 momentarily causes a compaction of the adjacent leaves within the chamber 27, thus effecting an edge seal at the outer ends of the leaves. Furthermore, air disposed between the leaves at the particular point is squeezed out and thus carry-over of the preheated air into the exhaust chamber 26 is eliminated. Thus the matrix leaves with the divider projections 36 and 37 are effective to provide a substantially continuous seal for sealing the said chambers 26 and 27 with respect to each other during rotation of the rotor.

Figures 6, 7, 8, 9 and 10 show modified forms of the invention. In Figure 8 the regenerator shows a certain modification, but in general the elements are the same. Figure 8 is a view similar to Figure 4, which is taken along the line 4—4 of Figure 1. In Figure 8, however, the divider 34 includes further an elongated rib or projection 43 which extends inwardly from the opposite sides 13 of the casing 11. Thus the sides 13, as well as the outer wall 14, is provided with an inwardly extending projection which is substantially continuous. In other words, the transversely extending projection 34, which is formed on the outer wall 14, also is coextensive with radially extending projections 43 disposed on inward surfaces of the cylindrical sides 12 and 13. Thus the projection 36 and projections 43 are of a U-shaped configuration. The regenerator also at the divider 37 is provided with similar projections 43, the divider 37 in the modification also being identically constructed as indicated in Figure 8.

As shown in Figure 6, a modified leaf 44 is utilized with the modification shown in Figure 8. The leaf 44 includes a tongue 45 and nibs 46 which are suitably engaged within the recess 22 as are the leaves 38 shown in Figure 5. Further the leaf 44 includes ribs 44'. In the operation which is best exemplified in Figure 8, the edges 48 of the leaf 44 bend or flex, this being readily accomplished as a result of the slots 47. As shown in Figure 9 the upper edges 49 engage the projection 34 and the adjacent leaves 44 are compacted against the leaf presently engaging the projection 36 similar to the action of the leaves 38 as described above.

In Figure 7 another modified leaf 50 is disclosed, this leaf including at its lower end a tongue 51 and projecting nibs 52, the said leaf 50 being secured in the same manner to the ring 20 as the leaves 38 and 44. In this particular leaf the central portions thereof are reinforced by means of beads 53 to hold the central portions of the leaf substantially rigid. The leaf 50 is also provided with slots 54 which permit the edges 55 to flex and bend as the edges 55 engage the ridges 43 as shown in Figure 8. Furthermore, the upper edges 55 of the leaves 50 can also flex or bend in view of the slots 54 in the manner indicated particularly in Figure 10 where the upper edges 55 are shown in slightly bent relation. The leaf 44 includes edge portions 56 spaced inwardly from the edges 48. Similarly the leaf 50 includes edge portions 57 spaced inwardly from the edges 55 to provide clearance with respect to the projections 43 since the edge portion 56 and 57 do not flex, though the edges 48 and 55 do as indicated. It must be realized that for the purposes of clarity, Figures 3, 4, 5 through 10 show the thickness of the leaves exaggerated and the spacing between the leaves exaggerated. However, actually the leaves are much thinner and the compaction of the leaves is such that the spaces between the leaves are very small and thus the possibilities of carry-over from one chamber to another are avoided by the close or contiguous relationship of the leaves.

Thus it is believed that the invention has been described and the operation has been clearly set forth. The objects of the invention have been fully accomplished in that the matrix with its operative relation to the dividers provides a seal between the chambers which is effective and continuous during operation of the rotor. Sealing has been achieved with a minimum of parts and in a simple and inexpensive manner. On the other hand, heat exchange has been efficiently accomplished.

It must be understood, of course, that changes and modifications may be made which do not depart from the spirit of the invention as disclosed or the scope thereof as defined in the appended claims.

What is claimed is:

1. A rotary regenerator comprising a casing, said casing including laterally spaced cylindrical side walls, a circumferentially extending outer wall connected to said side walls, a rotor mounted within said casing for rotation about the axis of said casing, said rotor having an outer ring with an outer peripheral surface spaced inwardly from the outer wall of said casing, means connected to said rotor for rotating the same, a pair of dividers within said casing positioned in circumferentially spaced relation to divide said casing into first and second chambers, each chamber having an inlet and an outlet opening, said dividers each comprising a first projecting means on said outer wall projecting radially inwardly toward the axis of said casing, second projecting means on opposite side walls, a matrix rotatable with said rotor, said matrix comprising a plurality of relatively thin flexible leaves connected to said ring and projecting outwardly from said peripheral surface, said leaves generally conforming to and having outer edges disposed in relatively slight spaced relation from said outer wall and from said side walls, said leaves each including oppositely disposed outer edges having inwardly extending slots to facilitate flexing of said leaves, the edges of said leaves engaging said projecting means during rotation of said rotor whereby leaves momentarily in contact and adjacent said projecting means are pressed together thereby effecting a continuous seal between said chambers during rotation of said rotor, and means for directing heated gases and air respectively to said inlet openings.

2. A rotary regenerator comprising a casing, said casing including laterally spaced cylindrical side walls, a circumferentially extending outer wall connected to said side walls, a rotor mounted within said casing for rotation about the axis of said casing, said rotor having an outer ring with an outer peripheral surface spaced inwardly from the outer wall of said casing, means connected to said rotor for rotating the same, a pair of dividers within said casing positioned in circumferentially spaced relation to divide said casing into first and second chambers, each chamber having an inlet and an outlet opening, said dividers each comprising projecting means on one of said walls projecting inwardly toward the axis of said casing, a matrix rotatable with said rotor, said matrix comprising a plurality of relatively thin flexible leaves connected to said ring and projecting outwardly from said peripheral surface, said leaves generally conforming to and having outer edges disposed in relatively slight spaced relation from said outer wall and from said side walls, said leaves each including oppositely disposed outer edges having inwardly extending slots to facilitate flexing of said leaves, the edges of said leaves engaging said projections during rotation of said rotor whereby leaves momentarily in contact and adjacent said projections are pressed together thereby effecting a continuous seal between said chambers during rotation of said rotor, and means for directing heated gases and air respectively to said inlet openings.

References Cited in the file of this patent

UNITED STATES PATENTS 2,549,656    Yerrick _____ Apr. 17, 1951

FOREIGN PATENTS 116,544    Austria _____ Feb. 25, 1930